United States Patent

[11] 3,622,990

[72] Inventors Gerhard Lerch
Weilheim;
Egon Penzkofer, Munich, both of Germany
[21] Appl. No. 851,148
[22] Filed Aug. 12, 1969
[45] Patented Nov. 23, 1971
[73] Assignee Krauss-Maffel Aktiengesellschaft
Munich-Allach, Germany
[32] Priority Aug. 14, 1968
[33] Germany
[31] P 17 63 816.3
Continuation-in-part of application Ser. No. 764,153, Oct. 1, 1968. This application Aug. 12, 1969, Ser. No. 851,148

[54] ELECTRONIC PROGRAMMER FOR MACHINE-CONTROL SYSTEMS

15 Claims, 14 Drawing Figs.

[52] U.S. Cl. .......... 340/147 R, 340/147 P
[51] Int. Cl. .......... H04q 9/00
[50] Field of Search .......... 340/147, 147 P, 166

[56] References Cited
UNITED STATES PATENTS
3,264,612 8/1966 Yetter .......... 340/147 P
3,230,355 1/1966 Chu .......... 340/166 X
3,317,894 5/1967 Jensen .......... 340/147 P
3,373,406 3/1968 Cannon et al .......... 340/166
3,396,379 8/1968 Chapman et al .......... 340/147 X

*Primary Examiner*—Donald J. Yusko
*Attorney*—Karl F. Ross

ABSTRACT: An electronic programming arrangement for machine operation in a system in which a switch arrangement represents a predetermined operating condition and is adapted to control an element, e.g. relay, electromagnetic valve or motor. The system has an amplifying transistor and circuitry for maintaining the transistor normally at a predetermined bias; the transistor is effectively connected with the machine-control element for operation thereof only upon the attainment of a predetermined operating bias. The switch arrangement includes a plurality of resistors in circuit with the transistor and the respective switch, each of which must be rendered effective before the transistor initiates the control operation. The switch arrangement may include a set of switch contacts in circuit with a DC source and the resistors in a crossbar array while the transistor operable by each set of switches becomes effective only when all of them have been set in a predetermined condition. The transistor serves as the input to a bistable switch device (e.g. a multivibrator flip-flop), also via a crossbar array, which can operate an output transistor arrangement as part of a switch system with similar crossbar arrays of resistors. A time delay network is provided between each of the transistors and the respective bistable multivibrators. The crossbar arrays are formed on a common printed-circuit plate.

Gerhard Lerch
Egon Penzkofer
INVENTORS.

BY

Karl G. Ross
Attorney

Gerhard Lerch
Egon Penzkofer
INVENTORS.

BY

Karl G. Ross
Attorney

INVENTORS:
Gerhard Lerch
Egon Penzkofer

BY

Karl G. Ross
Attorney

Gerhard Lerch
Egon Penzkofer
INVENTORS.

BY

Karl F. Ross
Attorney

Gerhard Lerch
Egon Penzkofer
INVENTORS.

BY

Karl G. Ross
Attorney

Gerhard Lerch
Egon Penzkofer
INVENTORS.

BY

Karl F. Ross
Attorney

Gerhard Lerch
Egon Penzkofer
INVENTORS.

BY

Karl F. Ross
Attorney

ELECTRONIC PROGRAMMER FOR MACHINE-CONTROL SYSTEMS

CROSS-REFERENCE TO RELATED APPLICATION

This application is a continuation-in-part of copending application Ser. No. 764,153 filed Oct. 1, 1968.

FIELD OF THE INVENTION

Our present invention relates to a programming arrangement for machine-control systems adapted to be used for the initiation of a sequence of machine-operating steps of the type which have been directed heretofore by sequencing, limit and position-detection switches; more particularly this invention relates to a circuit arrangement for the electronic control of sequential machine operations.

BACKGROUND OF THE INVENTION

It has become common practice in complex machinery to provide programming arrangements in the form of sequencing devices, limit switches and position-detecting elements which are adapted to trigger successive steps in a machine-operating cycle. The machine control is effected by various electrical elements, e.g. relays, servomotors, electromagnetically operated valves for hydraulic and pneumatic control elements or the like.

In a typical arrangement of this kind, for example an injection-molding machine for the high-rate production of thermoplastic articles, a plasticizing screw is driven to feed the thermoplastic material to an injection chamber, the mold halves are brought together by hydraulic or pneumatic cylinders, the injection ram is driven forwardly to force the plasticized resin into the mold, the ram may be withdrawn, the mold halves are retracted to release the molded article with or without the advance of a knockout-pin arrangement, and the mold is thereafter closed after a safety-switch arrangement has indicated that the previously formed article has been entirely ejected. The sequence of this machine is controlled by limit switches in the path of the mold slides, pressure-responsive switches, electromagnetic valves which are operated by such switches or optical devices (photocells), by contacts along the guide rails or by switch contacts provided on switch or programming disks or drums when the position-detection system includes rotating elements.

In machines of this type, a large number of interdependent series-connected switches must be provided so that each set initiates a subsequent operation. For example, it has been necessary heretofore to connect a switch indicating complete discharge of the molded article, a pair of limit switches indicating total retraction of the mold, a limit or position-responsive switch indicating full retraction of the knockout pens, and a switch responsive to the presence or absence of thermoplastic resins in the injection chamber, etc., in series for the initiation of the "mold-closing" step, an operation which may require only energization of two electromagnetic valves. These systems require sufficient space to allow the many switches to be mounted on the machine and involve time-consuming setting operations. Changes in the program of the machine are thus difficult and expensive.

OBJECTS OF THE INVENTION

It is, therefore, the principal object of the invention to provide an improved programming system for a multistep machine in which machine-control elements are operable in accordance with the settings of one or more switches representing the performance of preceding operations.

A more specific object of the invention is the provision of readily resettable programming means for a machine having a succession of operating steps and which requires little space, is relatively inexpensive and eliminates the need for many of the mechanical switching devices which have hitherto been necessary to carry out a considerable number of operations in sequence.

Yet another object is the provision of an electronic programmer capable of the improved control of sequential operations.

SUMMARY OF THE INVENTION

These objects and others which will be apparent hereinafter are obtainable, in accordance with the invention described in our application Ser. No. 764,153 and providing an electronic control circuit arrangement cooperating with a switch arrangement responsive to a predetermined prior contact and settable by hand or automatically to represent this condition and capable of energizing one or more machine control elements to initiate the subsequent operation.

The system of this invention includes transistor-amplifier means between the switch arrangement and the machine-control element (e.g. an electromagnetic relay and/or an electromagnetic valve, solenoid or other motor or operating mechanism), having a predetermined biasing condition which is altered by the operation of the switches to impart a bias level representing the attainment of the predetermined switch condition, whereby the output of the transistor serves to operate the control element only when all of the switches of the set have been properly prepared or actuated.

The switch arrangement may be constituted by a set of mechanical or electronic switching devices operated by hand, or by portions of the machine directly or indirectly in accordance with one aspect of this invention. In this case, the transistor operates one or more bistable multivibrators (flip-flops) which, in turn, act as switching devices for triggering relays of a similar set of transistors which must reach the desired bias level to be rendered operative.

In accordance with another aspect of this invention, the bistable multivibrator constitutes the switch arrangement which operates the transistors and, in turn, the relays.

According to an essential feature of this invention, each of the transistors is designed to be normally conductive and has a control element, e.g. the base, which is biased to reduce the conductivity of the transistor to zero (null) when all of the switches necessary to the particular set are in an actuated condition; only then is the associated multivibrator triggered to produce the output which operates the associated relay.

Still another important feature of this invention resides in the provision of a time-delay network between the transistor amplifier and the bistable multivibrator, the time-delay network being designed to prevent the transients normally generated in a switch-operated system from energizing the multivibrator prematurely.

According to a further, but important, feature of this invention, the setting of the program is facilitated in a particularly convenient and inexpensive manner by constituting the switch arrangement as a resistance system adapted to cut in or out one or more resistors, connected with the respective switches upon operation of the latter.

Thus, when the transistors have their bases adapted to trigger the bistable multivibrators or the relay or other device controlling the machine, we provide each of the switches of a particular set in circuit with the base of the transistor and in parallel with one another, with a characteristic series resistance which, when cut in by the respective switch contacts, suffices together with the other resistors of the actuated switches of the set to bring the base of the transistor to the desired operating bias, preferably a zero bias.

Advantageously, the resistors are connected in series with the respective switch, the base of the transistor and one terminal of the DC source. The other terminal of the DC source is returned to the junction between the first-mentioned resistor and the switch via a second resistor assigned to each switch.

Since overlapping sets of switches are generally desired to operate one or more bistable multivibrators, we have found it to be advantageous to associate a respective one of these second resistors with each switch so that a series circuit is formed between the second resistors, the respective switch and the DC source while a plurality of first resistors connect the respective transistors with the switches between the latter and the second resistors. It has been found that these "first resistors" can be readily exchanged, replaced or repositioned to establish the desired program by forming a matrix of printed-circuit board or the like, preferably in the form of a crossbar plate, the first resistors being soldered to two intersecting bars so as to be readily insertable, removable or replaceable therewith in accordance with the desired switching program.

As previously noted, one or more of the multivibrators may be connected to operate each of the machine-controlling elements in a predetermined set. Advantageously, this programming arrangement also makes use of a resistance switch arrangement wherein the bistable multivibrators constitute the switches and are connected in circuit with respective resistances to the bases of corresponding transistors which are brought to a predetermined bias to initiate operation of the control elements (i.e. a relay). In this case, a similar crossbar arrangement is provided between the output side of the multivibrators and the corresponding output transistors to enable the resistors to be rapidly inserted and removed, thereby facilitating the setting of the program.

The invention also provides for a unit construction or component system, mounted upon a single printed-circuit board and including the input transistor, its time-delay network, its bistable multivibrator, and the corresponding output transistor, the printed-circuit board having plugs enabling connection of the device to the input and output resistor matrixes and to the set of switches designed to control this unit. It is often convenient to mount the relay as well upon this printed-circuit board and provide switch contacts to the control devices (electromagnetic valves) of the machine.

It has been found, moreover, that even the arrangement described above using a crossbar network in conjunction with the input to the bistable multivibrators and an output crossbar network to feed the switching transistors, requires a relatively large number of extraneous conductors and the expense of wiring these conductors to the crossbar plates and the components associated therewith. While such wire systems are not excessively disadvantageous when the circuit is to be set up for a single-purpose programmer or processing machine, the circuitry does not permit sufficiently facile modification for other programmers or allow accommodation to machine sequences for apparatus such as injection-molding machines which require different programs depending upon the product to be made. Moreover, the bistable multivibrators provided ahead of the transistor amplifiers are not always necessary and their presence increases the cost of the circuitry.

It is the principal object of the present improvement over the system described in application Ser. No. 764,153, filed Oct. 1, 1968 to provide a programmer for machine-controlled systems which obviates the inconveniences mentioned immediately above and facilitates program change with a minimum of effort at low cost and which reduces extraneous wiring to a minimum.

The improved system of the present invention accomplishes this goal by providing an arrangement whereby the bistable multivibrators discussed above can be counted selectively in circuit with the transistor amplifiers, thereby permitting those networks which do not require bistable multivibrators in the supply network to omit them and allow only the desired feed networks to have such components as required for the switching goals.

According to a more specific feature of this aspect of the invention, the bistable multivibrators are provided directly upon the printed-circuit board upon which the crossbar conductors supplying these networks are formed, the system having an input crossbar array on a printed-circuit board feeding the transistor amplifier or gating circuits which are preferably also mounted upon the same boards. The transistor amplifiers, which preferably are fed with a plurality of crossbar conductors of one of the two mutually orthogonal arrays, have their outputs supplying corresponding conductors of an intermediate crossbar array, preferably on the same printed circuit board whereby resistors or impedance-free conjunctions may be provided between the mutually orthogonal arrays of conductors on opposite sides of the board of the intermediate crossbar network. This intermediate crossbar network, whose opposite-side conductors can form the inputs to the bistable multivibrators selectively mounted on the board, may be further formed on the same printed circuit board as an output crossbar network, the first-mentioned side of which has conductors orthogonal to the output as conductors and serving to allow selective connection of these output leads of the bistable multivibrator to the input leads of the output amplifying transistors, switching transistors, etc., on the other side of the printed circuit board.

In a switching arrangement using multivibrators, as described above in accordance with the present invention, the printed-circuit board has an array of parallel printed conductors which serve as inputs to the multivibrator and are arranged parallel to and upon the same side of the board as the conductors which supply the output transistor amplifiers. The output conductors of the bistable multivibrators run, therefore, transversely to and on the opposite side of the input conductors of these output transistor amplifiers so that extraneous wiring of these switching elements is no longer necessary and selective connection of the bistable multivibrator outputs with the inputs to the output transistor amplifiers can be effected at the crossover points of the output crossbar array. At these crossover points, impedance elements such as resistors or valve elements such as diodes may be provided to effect electrical connection, or impedance-free junctions may be selectively formed by soldered leads or plug-in conductors.

According to a further feature of the present invention, the output crossbar is provided with mutually parallel but spaced apart free conductors on the side of the printed circuit plate opposite the input conductors to the output transistor amplifiers and perpendicular to these input conductors. The free conductors allow in a uniquely simple manner the selective mounting and connection of the bistable multivibrator to either side of the array of conductors feeding the output transistor amplifiers and the transistor amplifiers themselves which are mounted directly upon the printed circuit board.

The intermediate crossbar and the output crossbar is provided, in accordance with the present improvement, as part of a single printed-circuit plate with throughgoing conductors in each array. Preferably the input crossbar is also provided upon the same printed-circuit plate and between the input crossbar and the intermediate crossbar, we may break the conductors of one array to facilitate the insertion of the transistor amplifiers of the input crossbar into the circuit. In this fashion, extraneous wiring is further reduced and the need for numerous conductors leading to and away from the printed-circuit board minimized. Moreover, the selection of the program can be simplified and the selected program ascertained by simple inspection of the printed-circuit plate.

To obtain maximum utilization of space, we prefer to make use of input and output (position-controlling) transistors which are grouped in a single integrated circuit or are of the potted-unit type so that several conductors of the input array and several conductors of the output array may be soldered to the leads of the unitary multitransistor network at the input side of the intermediate crossbar of the output side of the output crossbar. Furthermore, the electronic components, namely, the input transistor amplifiers, the bistable multivibrators, the position-setting transistors and the output transistors are of the laminated or integrated circuit type. It is possible in such an arrangement, according to this invention, to provide 150 switching inputs, 100 input transistor amplifiers, 50 bistable multivibrators and 50 position-determining transistors with a total of about 40,000 possible crossovers from which, say, 3 percent are provided with resistors bridging the orthogonal conductors at the respective junctions, in a structure using three stacked printed-circuit plates in accordance with German Industrial Standard DIN A 4 whereby the three printed circuit plates have a height of 130 mm. Nineteen contacts may be provided on the plug of the assembly.

According to a further feature of this invention, short circuit protection is provided in the form of a central short circuit network common to all of the output stages and preferably in the form of a bistable multivibrator which is so constructed that the outputs of the several stages are connected with respective diodes to the inputs of a single bistable multivibrator.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
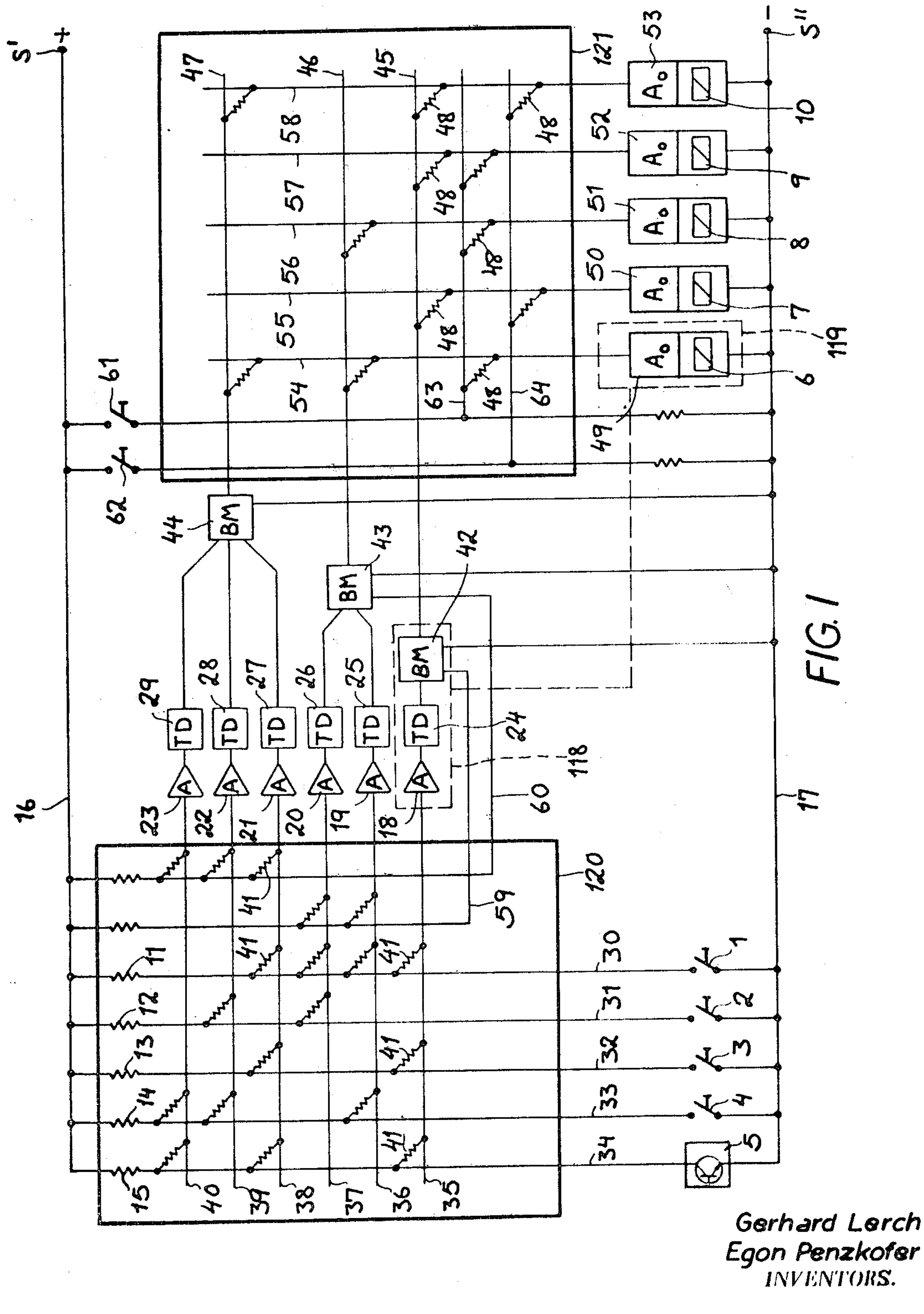
FIG. 1 is an overall schematic diagram of a system embodying the present invention.
Figure 4:
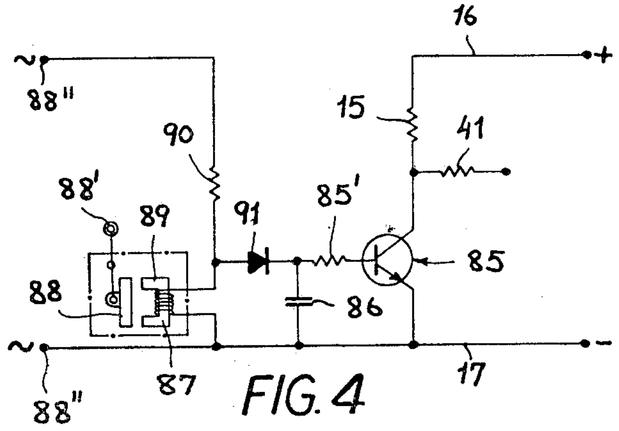
FIG. 4 is a circuit diagram of an electronic switch adapted to be used at the input side of the system.

In FIG. 1 of the drawing, we have shown a machine-control system having hand-actuated position-responsive switches 1–4 and an electronic switch which is represented diagrammatically at 5 but can be a mechanical switch (*5a*) or the electronic switch illustrated in FIG. 4.

The switches 1–4 may be operated by the control machine, e.g. an injection-molding-machine slide, as so-called "limit" switches at the end of the slide travel or as contacts in a rotary position-indicating system of the type described, for example, in *Servomechanism Practice*, McGraw-Hill Book Company, New York, 1960.

The system of FIG. 1 controls machine-operating elements such as fluid-control valves (electromagnetically operable) or servomotors of any desired type. Typical control elements of this character are described in *Perry's Chemical Engineers' Handbook*, McGraw-Hill Book Company, New York, 1963 and *McGraw-Hill Mechanical Engineers' Handbook*, McGraw-Hill Book Company, New York, 1958.

When reference is made hereinafter to switches settable to operate the device, therefore, it is to be understood that these switches may be provided with mechanical contacts or may be contactless (electronic) and that the control elements include devices other than electromagnetic valves in spite of the fact that only these may be specifically mentioned.

As can be seen from FIG. 1, each of the switches 1–5 is connected in series with a DC source represented as the terminals S′ and S″ and constituting the positive and negative terminals of the system, respectively. Between the switches 1–5, which are tied to the negative terminal S″, and the positive terminal S′ of the bus bars 16 and 17, we provide respective resistors 11, 12, 13, 14, and 15. Each switch combination or set of switches 1–5 is associated with a transistor amplifier A as represented at 18–23 in series with a time-delay network 24–29 represented by the box TD. The sets of switches 1–5 are determined by the connections of resistors 41 as will be apparent hereinafter and six sets can be discerned. Set I for example, which operates the transistor amplifier 18, includes switches 1, 3, and 5 while set II of transistor amplifier 19 is operable by switches 1 and 4 together with an electronic switching arrangement constituted by the bistable multivibrator 42 of switch set I. Similarly, switch set III is formed by switches 1 and 2 together with the multivibrator 42, while switches set IV includes switches 1, 3, 5 and the multivibrator 43 associated with switch groups II and III. Switch group V includes switches 2 and 4 and the multivibrator 43 while switch group VI is formed by switches 4, 5 and the multivibrator 43.

Figure 7:
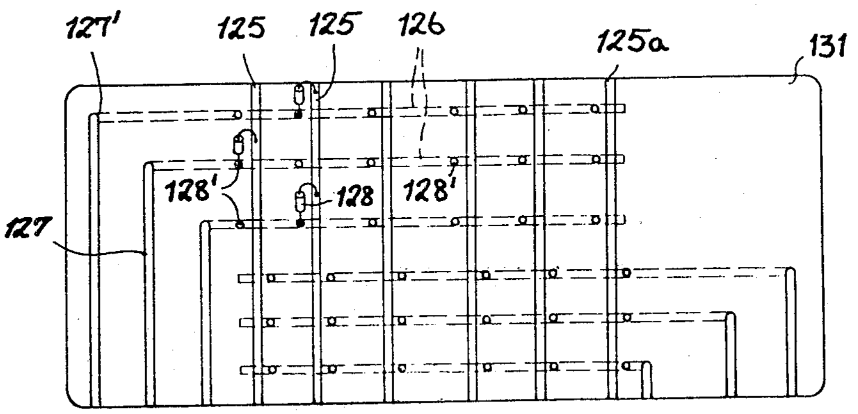
FIG. 7 is an elevational view of a crossbar arrangement according to the present invention.

The conductors 30–34 between switches 1–5 and the corresponding resistors 11–15 are orthogonal to the parallel conductors 35–40 which are connected to the bases of the transistors 18–23 so that the conductors 30–34 and 35–40, define a crossbar array which is represented generally at 120 and is structurally illustrated in FIG. 7. This resistor matrix includes resistors 41 at each of the intersections at which a junction is desired. The resistors are arranged at the intersections in accordance with the control program so that for the switch group I in which switches 1, 3, and 5 are to operate the transistor 18, three resistors 41 are provided at the intersections of lines 30 and 35, lines 32 and 35, and lines 34 and 35, respectively. Similarly, switch group IV additionally has a resistor 41 connecting a line 60 parallel to the lines 30–34 and coupled with the multivibrator 43, with the line 38 while lines 30, 32 and 34 are linked at the corresponding intersections with line 38 by additional resistors 41.

The resistance arrangement is dimensioned so that, when all of the switches 1, 3, and 5 of group I, for example, are energized the line 35 is brought to zero potential and operation of the transistor 18 is permitted. The transistor 18, as mentioned earlier, is connected with the time-delay network 24 of the RC type (resistance-capacitance) and designed to introduce a delay of about 10 prior to passage of a positive potential to trigger a corresponding bistable multivibrator of flip-flop 42 which is brought into its "on" condition. A positive potential is thereby generated at the line 43 of an output crossbar array 12′.

The output crossbar array 12′ includes parallel conductors 45–47 connected respectively to the bistable multivibrator 42 operated by the group I switches, the bistable multivibrator 43 operated by the switches of group II and group III jointly, and the bistable multivibrator 44 operated by the switches of groups IV–VI, jointly. Additional conductors 63 and 64 are associated with manually operable switches 61 and 62 which will be described in greater detail hereinafter.

Since it is desired that the switching arrangements 42–44, 61 and 62 operate the output elements (i.e. relays 6–10) in accordance with a predetermine grouping or program, resistors 48 are provided at the desired intersections of the parallel conductors 54–58, (orthogonally intersecting the conductors 45–47, 63 and 64) and connected with the transistor amplifiers $A_o$ represented at 49–53, respectively. These transistor amplifiers are designed to energize the relays 6–10 which are returned to the negative terminal S″. Consequently, when the bistable multivibrator 44 is energized, it can enable, via line 45 and the corresponding resistors 48, the amplifiers 50, 52 and 53 which are placed in operation when switch 62 is operated, when multivibrator 43 is triggered and when both switch 62 and multivibrator 44 are energized, respectively. Operation of the transistors 50, 52, and 53 results in energization of relays 7, 9, and 10 to, in turn, provide the next machine-controlling function.

Both transistor amplifiers 19 and 20 serve to operate the single multivibrator 43 via the respective time-delay networks 25 and 26. The three amplifiers 21–23 trigger the bistable multivibrator 44 via the corresponding time-delay networks 27–29. Further output transistor amplifiers 49 and 51 cooperate with respective lines 54 and 56 which are enabled by the bistable multivibrators 43 and 44. The resistors 48 bridge the desired intersection points of the lines 54–58 and 45–47, 63, and 64 to establish the control program.

In the case in which the "on" condition of multivibrator 44 is the first step in the process, a line 59 allows it to enable the second step by multivibrator 43, the line 59 being connected by appropriate resistors 41 to the transistor amplifiers 19 and 20 as part of the switch sets II and III described earlier.

In the system illustrated in FIG. 1, two starting relationships are possible for multivibrator 43. In the first case, switches 1 and 4 can be actuated while in the second case switches 1 and 2 can be triggered. In other words, switch groups II and III are both enabled by the multivibrator 42 but only one group need be completely activated to operate multivibrator 43 and initiate the second stage of the process. Multivibrator 43 may also enable the relays 6 and 8 via the output transistors 49 and 51 as previously discussed. The third stage of the machine operation makes use of the multivibrator 44 in the manner previously described, this multivibrator being enabled by the multivibrator 43 via line 60.

Manually operable switches 61 and 62 may be provided to allow control of the relay 7–10 or 6, 8, and 9 via lines 63 and 64 by hand for either cutting out machine operations or rendering additional operations possible. Whether such manually controlled switches are provided or not, we provide each of the prior-operating multivibrators 42, 43, etc. with an output adapted to enable a succeeding multivibrator stage and thus constituting part of the switch arrangement therefor.

Figure 2:
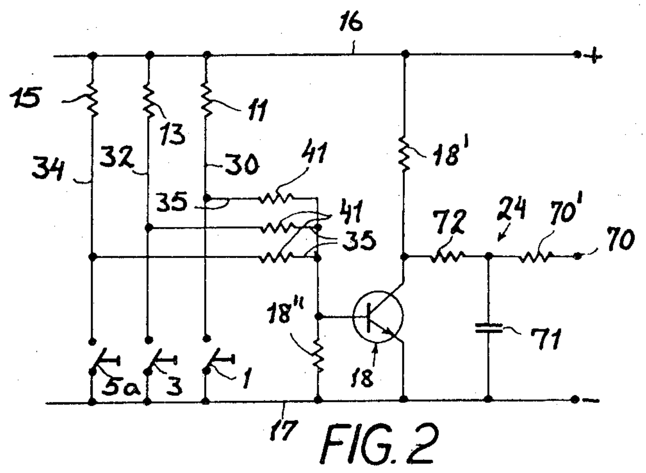
FIG. 2 is a circuit diagram of a transistor amplifier at the input side of the system, according to the present invention, illustrating its relationship with the respective set of switches.

In FIG. 2 we show a transistor stage which, for example, may represent that illustrated at 18 in FIG. 1. Here a mechanical switch 5*a* is shown in place of electronic switch 5. The reference numerals used here are, of course, identical to those used in FIG. 1.

Figure 3:
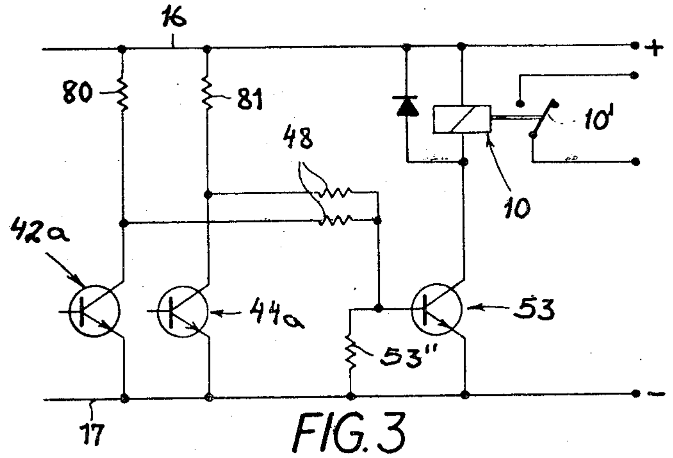
FIG. 3 is a circuit diagram of the output transistor arrangement according to the invention showing the relationship of the transistor amplifier with the relay controlled thereby.
Figure 6:
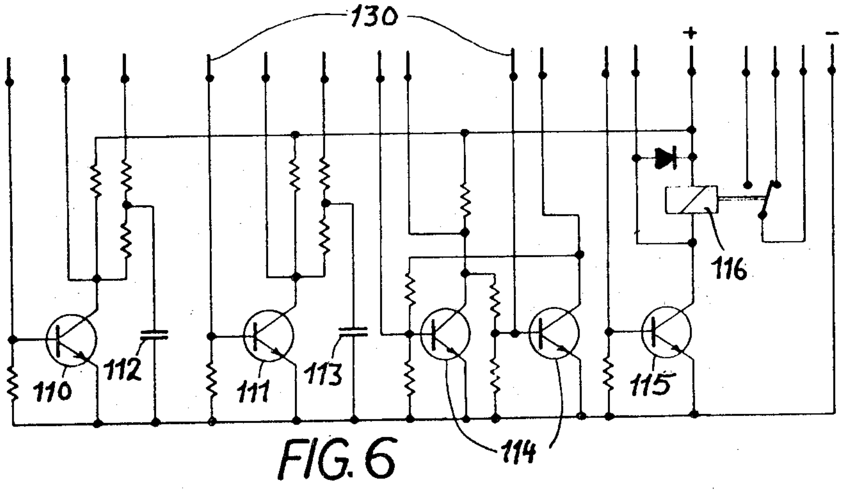
FIG. 6 is a circuit diagram of a component of the system of the present invention including input transistors, multivibrator, output transistor and relay.

The time-delay network 24 of this circuit is illustrated as a resistance-capacitance arrangement of resistor 72 and capacitor 71 connected across the emitter-collector electrodes of the transistor 18 with an output resistor 70′ tied between the resistor 72 and the capacitor 71 so that at point 70, an output is obtained for triggering the bistable multivibrator 42 (see FIGS. 3 and 6 for the circuit relationship of the multivibrator). The circuit arrangement of FIG. 2 includes resistors 11, 13, and 15 in series with the switches 1, 3 and 5*a* across the bus bars 16 and 17 of the positive and negative terminals, respectively. The base bias of the transistor 18 is established by an emitter base resistance 18′ and a base-collector resistance system constituted by the resistors 11, 13, 15, 41, and 18″. The base of transistor 18 thus has three resistors 41 connected in parallel which are short circuited to the negative potential by the switches 1, 3, and 5*a* when they are closed. The resistors 41 are in series with the base terminal of the transistor and the respective resistors 11, 13, and 15 with respect to the connection to the positive bus bar 16.

The resistors 11, 13, 15, and 41 are so dimensioned that the transistor 18 is only fully switched when each of the switches 1, 3, and 5*a* is closed so that the open condition of any one of these switches 1, 3, and 5*a* will maintain a bias at the base of transistor 18 such that it is ineffective. Thus, when all of the switches 1, 3, and 5*a* are closed, the base of transistor 18 is brought to zero potential and a positive voltage develops at the collector and transistor. After a delay of about 10 milliseconds, the positive potential builds up at the terminal 70 of the time-delay network so that premature transient positive spikes are not applied to the bistable multivibrator 42 to which the transistor 18 is connected.

The number of possible resistors 41 which may be used for the operation of each transistor 18 will be dependent, of course, upon the nature of the transistor, the voltage which may be applied across it, and sensitivity of the transistor circuit. Since the number of resistors 41 will also determine the control function which may be performed by a particular network, it is desirable to have the highest number possible according to the present invention. We have found that with silicon transistors which are operable at high voltages, it is possible to use a potential of 24 volts across the bus bars 16 and 17 and thus employ 24 resistors 11, 13, 15 and 41. Furthermore, the resulting high number of control functions has been found to be particularly convenient for even the most complex operations such as the programming of injection-molding machines.

In FIG. 3, we have shown the output transistor arrangement of the system of FIG. 1 in greater detail.

The output sides of multivibrators 42 and 44 are represented by transistors 42*a* and 44*a*, respectively, having the resistors 80 and 81 connected in the emitter-collector networks across the DC source represented by bus bars 16 and 17. As described in greater detail in FIGS. 1 and 2, the sequence-control and selection resistors 48 at the output side of the system are tied in parallel with one another to the junctions of the resistors 80 or 81 with respective collectors of the transistors 42*a* and 44*a*.

The resistors 48 are, together with the resistors 80 and 81 (corresponding to resistors 11, 13, etc.) connected between the positive bus bar 16 and the base transistor 53. The control base bias is applied by a resistor 53″ connected between the base and the negative bus bar 17. As soon as the bases of the output transistors 42*a* and 44*a* are rendered currentless, corresponding to the "on" condition of the multivibrator, the base of output transistor 53 is energized via the resistors 48 to turn on the relay 10 and operate its switch 10′ to control an electromagnetic valve or the like for initiating a subsequent machine-operating step.

The output transistor 53, as described in connection with amplifier transistors 18–23 in FIG. 1, may cooperate with a multiplicity of resistors 48 to provide a large number of control functions and responses. Furthermore, the relay 10 can be controlled via further amplifier means so that two or more output matrices of resistors can be used to further increase the switching and programming possibilities.

In FIG. 4, we show the electronic switch which is represented at 5 in FIG. 1 and which can be substituted for any of the switches 1–4 as well. In this circuit, the transistor 85 is operated by a differentiation circuit or trigger network (Schmitt trigger) the former being illustrated in FIG. 4 and including a capacitor 86 connected between the negative bus bar 17 and bias resistor 85′ of the transistor 85. The capacitor 86 is energized over a diode 91 from the induced potential over a magnetic detector represented at FIG. 4 as having an induction coil 87 surrounding a U-shaped magnetized yoke 89 with which the armature 88 cooperates.

When the tripper 88′ (a spring tongue or the like) is engaged by a moving portion of the machine or a stationary portion when the switching device is shifted on a moving portion of the machine, the armature 88 is brought into contact to the yoke 89 to complete the magnetic circuit and to induce an electric current in the coil 87, the induced electric current being superimposed upon the AC energizing current applied at the terminals 88″. A resistor 90 in series with the coil 87 acts as a current-limiting device. The resistor 90 is so dimensioned that the voltage drop through the induction coil 87 in the open magnetic circuit between yoke 89 and armature 88 is smaller than the through-flow potential of the diode 91 and the base-emitter network of the transistor 85; when the magnetic circuit is closed, however, the higher voltage drop is detected by the transistor 85, the emitter-collector network becomes conductive to connect the respective resistor 41 and resistor 15 in the control circuit as if a contact switch was provided.

Figure 5:
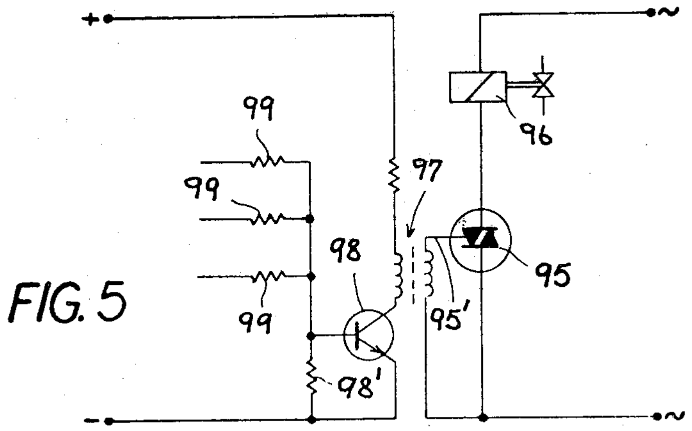
FIG. 5 is a circuit diagram of an electronic relay or switch operation without mechanical contacts for controlling the machine element (i.e. an electronic valve)

As previously noted also, the mechanical-contact relays of FIG. 1 can be replaced by electronic switches, a suitable circuit of which is shown in FIG. 5. In this Figure, the electronic switch is a Triac double thyristor whose control element 93' is connected to the secondary winding of a current transformer 97 in series with the output transistor 98. The operating potential of transistor 98 can be an alternating current of intermediate frequency (30 kHz.) superimposed upon the normal DC potential. The base-emitter bias is supplied by a resistor 98' while resistors 99 correspond to the resistances 48 of FIG. 1. When transistor 98 becomes conductive, a potential is applied at 95' to the triac device which is rendered conductive to operate the electromagnetic valve 96.

In FIG. 6, we have shown a circuit of a control unit mounted upon a single printed-circuit board according to the present invention and having a multiterminal plug represented at 130 whereby the printed circuit unit can be incorporated in a machine control system. The control unit includes a pair of amplifier transistors 110 and 111 (corresponding to the transistors 18–23 of FIG. 1), in circuit with respective time-delay networks 112 (corresponding to the networks 24–29). Both of these amplifying transistors 110 and 111 are connected in parallel to a multivibrator indicated at 114, the output of which is applied to the output transistor 115 as described in connection with FIG. 3 for the output transistor 53. The collector-emitter network of the transistor 115 is connected in series with the relay coil 116, corresponding to one of the relays 6–10. The network of FIG. 6 thus combines in a single unit the structure represented in broken lines at **11*a*, 119 in FIG. 1. As is customary in such components, the plug 130 can be mounted on the edge of a printed circuit board 118, 119. The relay 116, which advantageously has a switching capacity of 15** amperes at about 220 volts, can also be counted on the board which may have dimensions of about 70×70 mm. Thirty of such printed circuit units have been found to be satisfactorily for the complete control of an injection-molding machine.

As can be seen from FIG. 7, the input and output resistor matrixes comprise a nonconductive etched or printed circuit board 131, preferably provided with plugs as illustrated in connection with FIG. 6 or with jacks to receive the plug 130 and has on its opposite sides the orthogonal arrays of mutually parallel but spaced apart conductors 125 and 126. The latter are connected to leads 127 on the upper surface of the plate through holes 127' in the plate 131. At each of the intersections, additional holes 128' are provided in which the resistors 128 are replaceably soldered to the conductors 125 and 126. The resistors 128, of course, represent the resistors 41 or 48 previously described. The conductors are formed by any of the conventional printed circuit techniques. Instead of plugs, the end portions **124*a*of the conductors 125 may serve as plugs cooperating with jacks of conventional construction adapted to receive same. To alter the program, it is merely necessary to unsolder the undesired resistor and replace it with another or move the resistor to another intersection. The conductive plates are represented by the bold line borders in FIG. 1 as shown at 120 and 121**.

Figure 8:
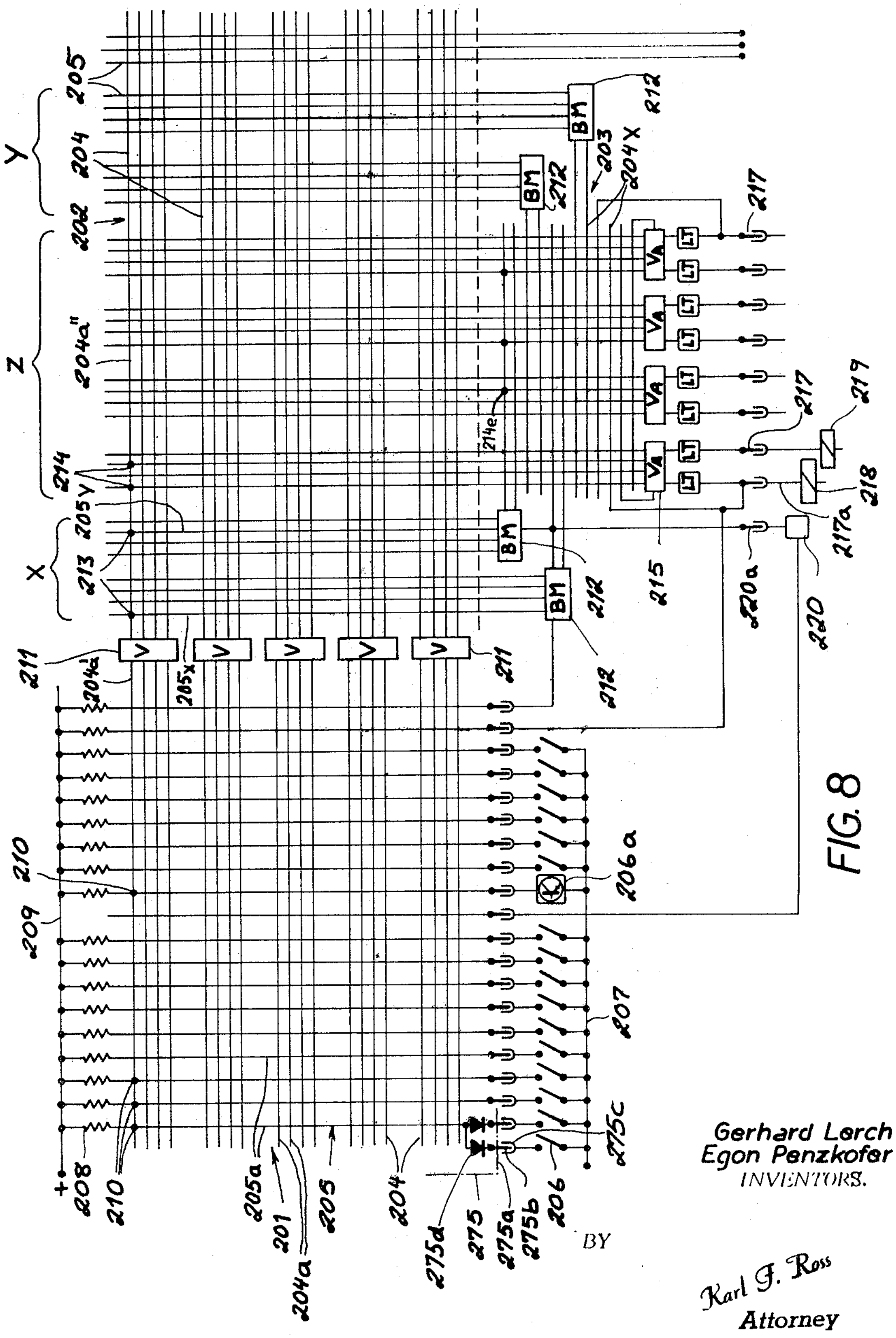
FIG. 8 is a diagrammatic view generally similar to FIG. 1 of an improved circuit arrangement, according to the present invention.

In FIG. 8, we show a switching arrangement according to an improvement of the present invention wherein the crossover points 10, 13, 14 and **14*a* are illustrated diagrammatically as dots but will be understood in the case of points 210, 213 and 214 to be resistors as described in connection with FIG. 1 while in the case of the points 214*a*** they will be understood to be passive electronic circuit elements such as resistors, diodes and the like.

Figure 12:
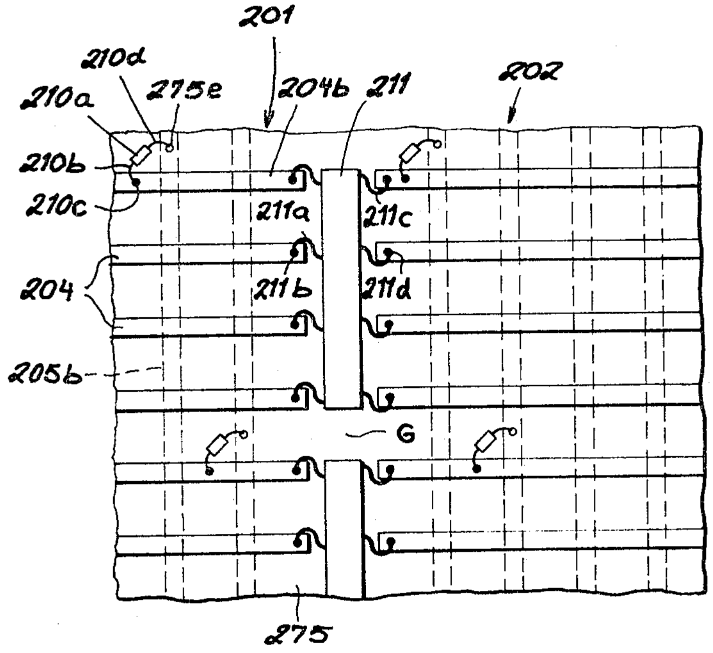
FIG. 12 is a diagrammatic plan view of a portion of one side of the printed circuit boards of the system of FIG. 8.

The network of FIG. 8 comprises an input crossbar array 201 analogous to the crossbar array at 120 in FIG. 1, an intermediate crossbar array 202 and an output crossbar array 203, the latter being analogous to the crossbar array shown at 121 in FIG. 1. The crossbar arrays 201, 202 and 203 are formed upon a common printed-circuit plate with mutually orthogonal arrays of conductors as represented generally at 204 and 205. Conductors 204 are shown to be grouped in fours and they run horizontally in FIG. 1 while the conductors 205 of the input crossbar 201 run vertically with uniform spacing while those of the intermediate and output crossbar arrays 202 and 203 are grouped in fours. The conductors 204 are provided on the underside of the plate as viewed in FIG. 13 but at the top of the plate as seen in FIG. 12. While the arrays are shown to be mutually orthogonal, it will be understood that the present invention merely requires that they be mutually intersecting to form crossover points at which connection may be made between the conductors on opposite sides of the plate and that they may, consequently, intersect at angles other than 90°.

The input side of the printed circuit board, represented at 275 is shown to be formed with an edge **275*a* at which an array of plug terminals 275*b* are provided for receipt in respective jacks 275*c* enabling the connection of limit switches 206, time-dependent switches or electronic switching devices 206*a* and the negative bus bar 207 to the individual conductors 205*a* of the input crossbar 201. Several of the plug contacts 275*b* may be provided with rectifier diodes 275*d* for isolating or gating purposes. The switches 206, 206*a* correspond, of course, to the input switches 1–5 of FIG. 1** and constitute the inputs from the machine which are to control the operation of the various relays, valves and other elements adapted to respond to the individual, joint, sequential or parallel actuation of these switches. Hence the switches may be position-responsive elements (e.g. the limit switches mentioned earlier), time dependent elements (e.g. adapted to indicate the completion of a predetermined time lapse after a predetermining machine operation) or like sequencing components.

They may be relays or simple switches, electronic switches or more complex electronic devices as may be required. On the other side of the input crossbar 201, the vertical conductors **205*a* are provided with respective resistors 208 which are, in turn, tied to the positive terminal or bus bar 209 of the DC source. A plug-and-jack connection may be provided for this purpose as well as along the same edge 275*a*** of the printed-circuit plate or upon another edge of the latter.

As described in connection with FIG. 1, the vertical conductors **205*a* of the input crossbar 201 may be tied selectively to the horizontal conductors 204*a* of the other side of the printed-circuit board by resistors inserted in or with leads traversing openings in the printed circuit board in the usual manner. Although it is preferred that the resistors represented at 210 diagrammatically in FIG. 8, be able to be soldered into place or be able to be removed by unsoldering its leads, we may provide pin terminals or the like by which the resistors may be inserted as individual plug in units or to which the resistors may be soldered. An example of the former arrangement is shown in FIG. 12 where a resistor 210*a* is shown to have a lead 210*b* soldered at 210*c* to a specific horizontal conductor 204*b* while its other lead 210*d* passes through an opening 275*e* in the printed-circuit plate and is soldered through this opening to a specific vertical conductor 205*b***.

The resistors 210, of course, select the desired response of the programming circuit to the operation of switches 206 and **206*a*. In other words, the resistors 210 determine which of the horizontal conductors 204*a*** will deliver inputs to the further stages of the programming circuit.

In FIG. 8, four resistors 210 are shown to connect the vertical conductors **205*a* with a horizontal conductor 204*a'***.

Figure 9:
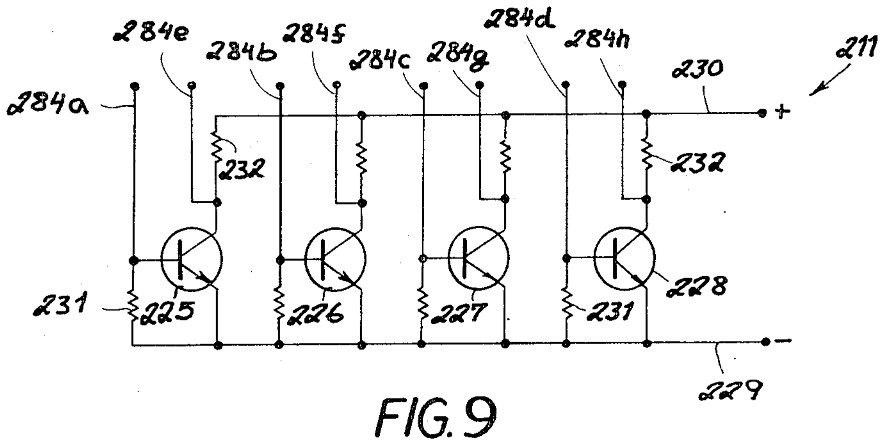
FIG. 9 is a detail of the input transistor network of the arrangement of FIG. 8.

Each group of four horizontal conductors 204 constitutes the input to an input-transistor amplifier circuit represented at 211 and constituting an integrated circuit amplifier V whose circuit configuration is illustrated in FIG. 9.

Figure 13:
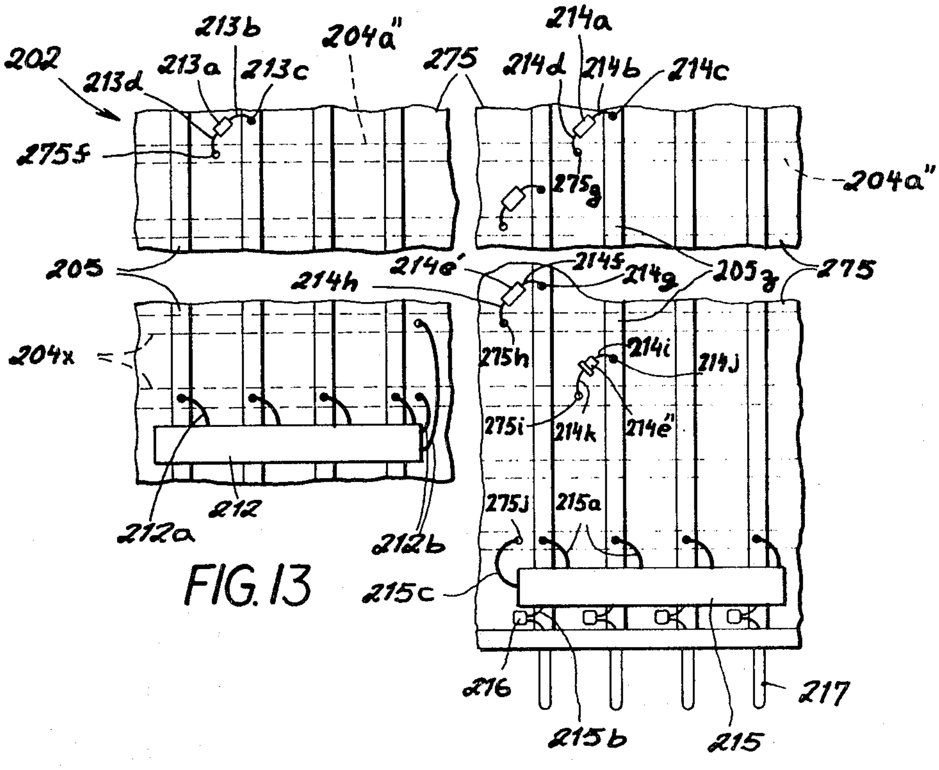
FIG. 13 is a similar diagram of the other side of this printed circuit board.
Figure 14:
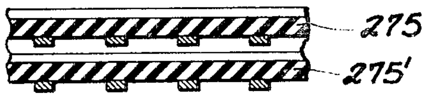
FIG. 14 is a diagrammatic end view showing the stacked arrangement of printed circuit boards used in accordance with the present invention.

As is also apparent from FIG. 8, the uppermost input transistor network 11 constitutes a four-input AND gate and is rendered effective only when all four switches 206, associated with the conductors **205*a* at which resistors 210** are provided, are closed. There results a positive potential upon the upper conductor 204a'' the output side of the uppermost amplifier 211 and forming part of the intermediate crossbar array 202. This potential may be selectively applied to one or more of the vertical conductors, e.g. conductors 205x and 205y of the intermediate crossbar which potential is applied thereto by resistors 213 which link the conductors 205x and 205y with the conductor 204a'' are soldered in place selectively as previously described. In FIG. 13, for example, we show one such resistor 213a which has its lead 213b soldered at 213c to the conductor 205y in the printed-circuit plate 275 and is soldered to the conductor 204a''. Note that, as shown in FIG. 14, several such plates 275, 275', –may be superimposed or stacked to save space.

The two left-hand groups of four conductors 205 represented generally at X and the two right-hand groups at Y flank four intermediate groups A as can be seen at the right-hand side in FIG. 8 and serve as inputs to bistable multivibrators 212. The bistable multivibrators 212, in turn, have output leads represented at 204x which runs transversely to their input leads to the conductors of the group Z which feed transistor amplifier 215 controlling the operative electrical mechanical device represented as electromagnetic valves at 218 and 219. The outputs of the input transistors 211 may be connected directly as inputs to the transistor amplifier 215 by resistor junctions as represented at 214, the resistors bridging conductors serving as the outputs from transistors 211 and conductors of the group Z. This is shown in greater detail in FIG. 2 in which the resistor 214a is shown to have a lead 214b soldered at 214c to a conductor 205z and a further lead 214d passing through opening 275q and soldered to the conductor 204a''.

In addition, the multivibrator output leads 204x can be connected as inputs to the transistor amplifiers 215 at points represents diagrammatically at 214e in FIG. 8 by passive electronic components, e.g. resistors or diodes. For example, in FIG. 13, a resistor 214e' shown to have a lead 214f soldered to one of the vertical conductors of group X at 214q and a further lead 214h passing through an opening 275h in the printed circuit plate 275 and soldered to one of the horizontal conductors 204x. A further passive electronic element may be the diode 214e'' has a lead 214i soldered at 214j to one of the leads 205x and a further lead 214k passing through the opening 275i and soldered to another of the conductors 204x.

Figure 10:
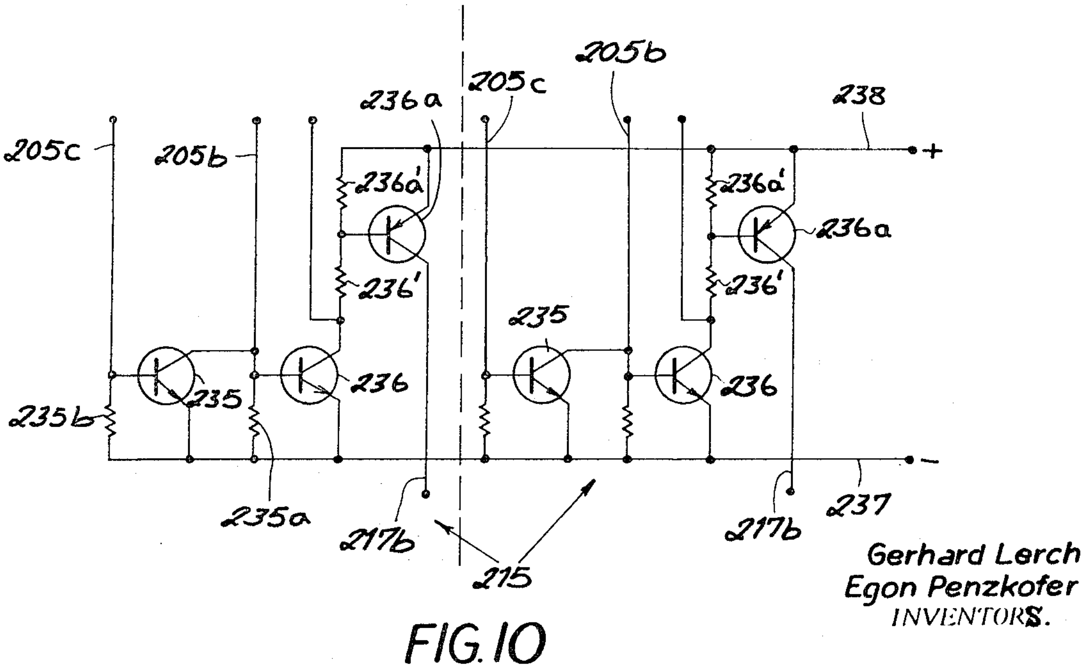
FIG. 10 is a circuit diagram of the output transistor arrangement of network of FIG. 8.

The transistor amplifiers 215 are formed as integrated circuits in units VA (FIG. 8) and are mounted directly upon the printed-circuit board (FIG. 13) and may be grouped in units of two as illustrated in FIG. 10. The transistor amplifiers 215 may also feed output transistors 216 individually to the terminal pins 217 which are formed along an edge of the printed-circuit plate 175 and are connected to the jacks 217a of the magnetic valves 218, etc. A typical assembly is illustrated in FIG. 13 in which one of the amplifier assemblies 215 is shown to have leads 215a coldered to the respective input conductors 205z, output leads 215b feeding the output transistors 216 and a lead 215c passing through an opening 275j in the printed-circuit board and soldered to one of the horizontal conductors 204.

The output crossbar 203 thus permits ties to be made between the transistors 215 and the outputs of the bistable multivibrator as well as with the amplifiers 211 directly so that the multivibrators can be omitted from the circuit. In addition, a time-delay circuit 220 may be provided and can be coupled with one of the leads 204 or 205 as represented in FIG. 8 by a plug-and-jack connection 220a to cut off a potential at the bistable multivibrator upon the lapse of a predetermined time. In place of the transistors 216, double thyristors of the triac type as shown at 95 in FIG. 5.

It can also be seen from FIG. 1 that wiring is only required between the switch 206, the magnetic valves 218 and 219 and the supply lines and that such wiring may be simplified by use of plug-and-jack connections. All other connections are made by the selective soldering or unsoldering of resistors, diodes, transistors and bistable multivibrator networks.

In FIG. 13, it may be seen that each of the multivibrator units 212 has leads 212a which are connected to the vertical conductors 205 of the intermediate crossbar 202 and further conductors 212b soldered to the transverse conductors 204x. FIG. 12 illustrates the gaps interrupting the conductors 204 and enabling the input transistor networks 211 to be inserted. In this Figure the uppermost input transistor 211 is shown to have leads 211a soldered at 211b to the ends of the left-hand group of horizontal conductors 204 and output leads 211c soldered at 211d to the corresponding conductors of the intermediate crossbar 202.

Figure 11:
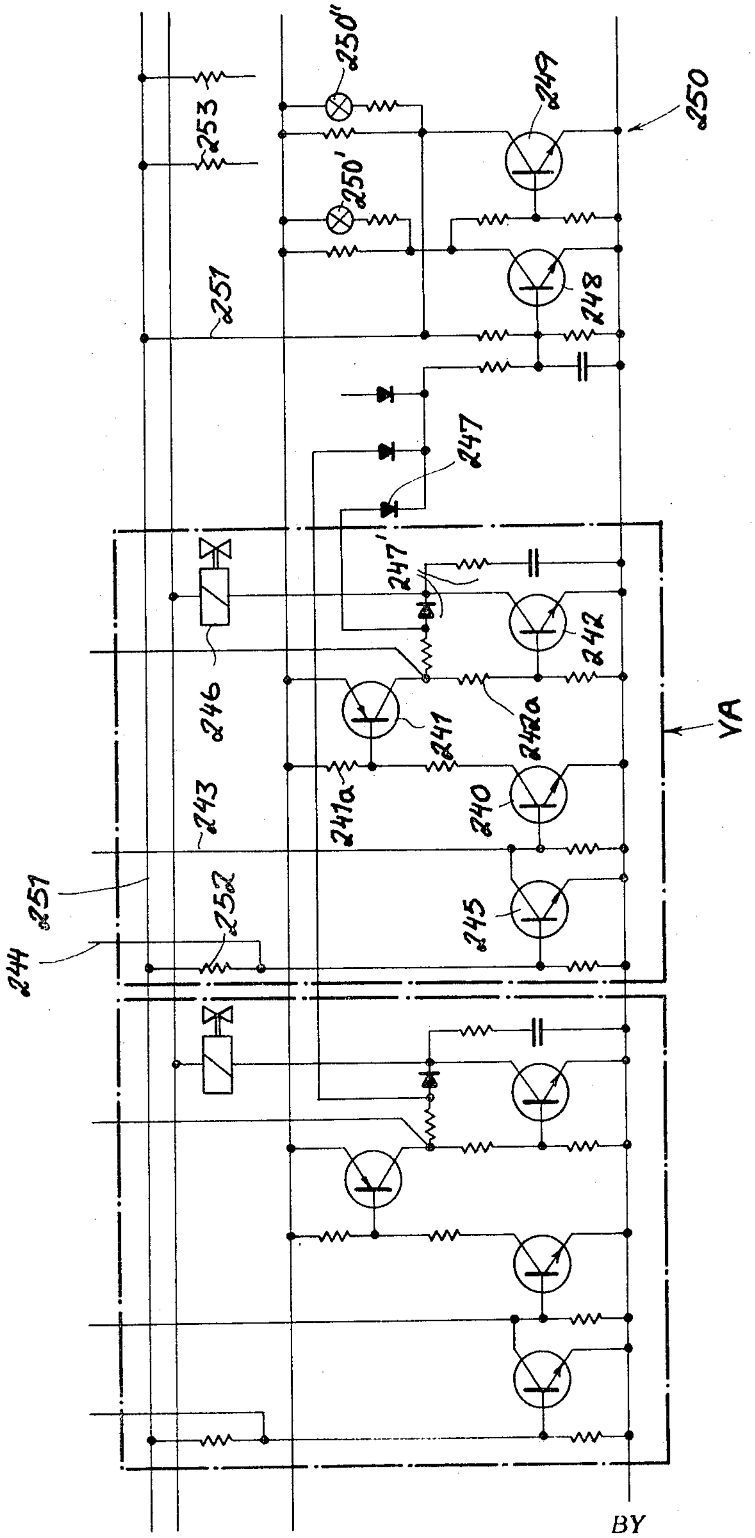
FIG. 11 is a circuit diagram of the short circuit protection network, in accordance with the present invention.

Referring now to FIG. 11, it can be seen that the input amplifiers 211 each comprises a four-transistor unit constituting an integrated circuit with four inputs and outputs as represented diagrammatically in FIGS. 8 and 12. The four inputs, which are connected to the horizontal conductors 204 of the input crossbar are represented at 284a, 284b, 284c and 284d and are connected to the bases of four transistors at 225, 226, 227 and 228 of the NPN-type. The collectors of these transistors are connected at 284e, 284f, 284g, 284h with conductors 204 of the intermediate crossbar 202 and the positive bossbar, supplying the transistors 225–228, is represented at 230 while the negative bus bar is represented at 229. The base-emitter bias for each of the transistors is provided by a resistor 231 in the base-emitter network while a load resistor 232 is provided in the emitter-collector path between the bossbars 229 and 230. The four transistors 225–228, the respective resistors 231, 232 and any associated circuitry is constituted as a single unit in laminated or integrated circuitry with only the connecting leads projecting from the potting compound or the body of the integrated circuit.

In FIG. 10, we show the switching circuitry of the output transistor units 215, each of which comprises two units 233 and 234 which serve to connect lines 205 of the output bossbar 203 with the terminals 217, via the amplifier 216 if desired. Each of the components 33 and 34, which may be formed as integrated-circuit chips, comprises a two-stage switching amplifier 236, 236a consisting of a NPN-/and a PNP-transistor, respectively, which is supplied via the input lines 205b (approximately 10 μA.) the output conductors being represented at 217b. The output is here trapped off between the collectors of the transistors 236a in series with the positive bossbar 238 and between the collector and the negative bossbar 237. The outputs may trigger the transistors 216 which may be operated with substantially larger current of the order of (100 ma.) magnitude necessary for triggering the electromagnetic devices 218 and 219. The base-emitter bias is provided for the transistors 236a by the resistors 236a' these transistors are fed from the transistors 236 via resistors 236' in series with the collectors of the transistors 236 and the bases of transistors 236a, respectively. The NPN/PNP combination of the transistors 236 and 236a of each two-stage switch 215 has it advantage that in the nonenergized state (blocking condition) the switch draws no current and is a consumer of current only in the "on" condition.

Each of the networks 215 includes a further cutoff transistor 235 of the NPN-type which may be supplied with a relatively low current over a blocking-input conductor 205c. The collector of the transistor 235 is connected to the base of the corresponding transistor 236 and to the negative bus bar 237 via a resistor 235a while a base-bias resistor 235b is provided in the emitter-base network. By providing a relatively small current at the blocking input conductor 205c, we are able to cut off the transistors 236 and 236a since the collector-emitter voltage of the transistor 235 is smaller than the base-emitter potential of the transistor 236.

In FIG. 11, we have shown a central short circuit protection network adapted to be used in the system of the present invention especially in conjunction or in place of the circuit represented at 215. In this circuit, the output amplifiers 233 and 234 are each replaced by a circuit of the type represented in FIG. 11 or the multivibrator arrangement of the latter, represented at 250, is used in conjunction with the amplifier 233 or 234. This short circuit protection is provided by transistors 240 and 241 of the NPN-/and PNP-types, respectively, the base of the transistor 241 being energized across the resistor 241*a* in circuit with the collector-emitter network of transistor 240 across the positive and negative bus bars, respectively. The amplifier transistor represented diagrammatically at 216 is here shown at 242 and has as its input a base signal applied through the resistor 242*a* by the collector-emitter network of transistor 241. The emitter-collector network of the high-capacity transistor 242 is connected in series with a load, e.g. an electromagnetic valve 246 (as represented diagrammatically at 218 or 219 in FIG. 1) in series between the positive and negative terminals of the power supply.

Thus transistors 240 and 241 and the current-multiplying output transistor 242 may represent one of several components connected with the output crossbar as represented diagrammatically in FIG. 8 in place of the combination 250, 260. The short circuit protection component is energized by a line 243 running to the base of transistor 240 while the transistor 245 receives current through line 244 and performs the functions of the transistors 245 described in connection with FIG. 10. When a potential (blocking) is applied by line 244 to the transistor 245, the output stage 241 is quenched in spite of the continued presence of a potential at the input 243.

When a short circuit occurs at the electromagnetic valve 246 connected in the circuit by the unit shown at VA in dot-dash lines in FIG. 11, the potential on the collector of the output transistor 244 increases and the diode 247 is rendered effective via the pulse-shaping network 247 to trigger the transistor 248 of a bistable multivibrator 250 whose other transistor is represented at 249. The positive lead to the transistor multivibrator is represented at 251 and is connected via a resistor 252 which, in the arrangement of FIG. 8, is soldered in the output crossbar 203 to feed the transistor 245, thereby rendering transistors 240 and 241 nonconductive and cutting out transistor 242 to deenergize the electromagnetic valve 46. Correspondingly, further resistors 253 are provided at all of the output stages and all of the latter are cut off upon development of a short circuit condition in any one of the units. Further damage to the apparatus may be avoided. The short circuit protection is also effective when a defect occurs in the energization of the transistors 242. Lamps may be provided at 250' and 250'' to indicate a normal and defect state of the system. The bistable multivibrator 250 thus acts as a common electronic switching means responsive via diodes 247 to a short circuit in any of the output devices to deenergize all of them via the respective blocking transistors 235 or 245.

We claim:

1. A system for programming a machine to activate a number of machine-control elements in response to switch conditions of a switch arrangement, thereby initiating a sequence of machine operations, said system comprising:

a plurality of switches operable to establish said condition:

a plurality of input-transistor amplifiers;

an input crossbar network between said input-transistor amplifiers and said switches with mutually intersecting arrays of parallel conductors interconnectable at conjunction points by respective passive elements to energize said input-transistor amplifiers selectively in accordance with the conditions of said switch arrangement, the conductors of one array being connected to said switches and the conductors of the other array being connected to inputs of said transistor amplifiers;

respective resistors in series with said switches and the conductors of said one array and forming AND gates with said transistor amplifiers;

a printed-circuit plate composed of at least one printed-circuit board and formed with an output crossbar network of a first array of mutually parallel conductors on one side of said plate connected to the outputs of said input-transistor amplifiers, and of a second array of mutually parallel conductors on the other side of said plate orthogonal to the first array and defining conjunction points therewith;

a plurality of bistable-multivibrator memories connected to selected groups of conductors of said second array for receiving inputs therein;

a plurality of passive elements on said printed-circuit plate electrically tying selected conductors of said first array to selected conductors of said second array at respective conjunction points to establish the response of said machine-control elements to said switch conditions, said passive elements on said printed-circuit plate selectively connecting said bistable-multivibrator memories in circuit with at least some of said input transistors for energization thereby to produce outputs at said bistable-multivibrator memories;

a further crossbar network on said printed-circuit plate having mutually intersecting arrays of parallel conductors with at least some of the conductors of one array of said further crossbar network being connected with the outputs of said bistable multivibrator memories; and output transistors having their inputs connected to conductors of the other array of said further crossbar network and outputs connected to the machine-control elements for operating same, the conductors of said one array of said further crossbar network and said second array of said output crossbar network being formed on a common side of said printed-circuit plate and the conductors of said other array of said further crossbar network and of said first array being disposed on a common side of said printed-circuit plate.

2. The improvement defined in claim 1 wherein an intermediate crossbar network is provided between said input transistors and said bistable multivibrators, said intermediate crossbar network including intersecting arrays of conductors on opposite sides of a printed-circuit plate, said multivibrators being supplied with conductors of said intermediate network parallel to and upon the same side of the printed-circuit plate as the conductors of the output crossbar network supplying said output transistors, said bistable multivibrators having their outputs connectable to the conductors on the other side of said printed circuit plate whereby said circuit elements serve to connect said bistable multivibrators with said output transistors selectively.

3. The improvement defined in claim 1 wherein said output crossbar network is provided with free conductors on said plate transverse to and on the opposite side of said plate from the conductors supplying said output transistors.

4. The important defined in claim 3, further comprising transistor amplifier means connectable in circuit with said output transistors for controlling the current flow to said machine-control elements.

5. The improvement defined in claim 1 wherein said intermediate crossbar network and said output crossbar network are formed on a single printed circuit plate with conductors of said networks running through from one network to the other.

6. The improvement defined in claim 5 wherein said input crossbar network is formed on the common printed-circuit plate of said intermediate and output crossbar networks.

7. The improvement defined in claim 6 wherein a plurality of said input transistors is grouped in a single integrated-circuit unit.

8. The improvement defined in claim 6 wherein a plurality of said output transistor is grouped in a single integrated-circuit unit.

9. The improvement defined in claim 6 wherein a plurality of such printed-circuit plates are stacked together.

10. The improvement defined in claim 1, further comprising a short circuit protection circuit connected to all of said output transistors and adapted to deenergize all of said elements controlled by said output transistors upon a short circuit indication at any of said elements.

11. The improvement defined in claim 10 wherein said circuit includes a bistable multivibrator and respective inputs to said bistable multivibrator from some of said output transistors.

12. The improvement defined in claim 11 wherein said inputs to said bistable multivibrator of said circuit each include a diode connected in circuit with the respective output transistor.

13. The improvement defined in claim 12, further comprising a blocking transistor in circuit with each of said output transistors and energizable to apply a blocking signal terminating conduction of the respective output transistors, said multivibrator of said circuit being connected to said blocking transistors for energizing same upon short circuit of any of said machine-control elements.

14. The improvement defined in claim 6 wherein said circuit elements are resistors and rectifier diodes.

15. The improvement defined in claim 6 wherein each of said output transistors includes a NPN/PNP conjuguate pair of transistors so connected and arranged as to draw electric current only in a conductive condition of the output transistor.

* * * * *